(12) United States Patent
Dumm et al.

(10) Patent No.: US 12,103,475 B2
(45) Date of Patent: Oct. 1, 2024

(54) FASTENING ARRANGEMENT AND METHOD FOR PRODUCING A FASTENING ARRANGEMENT

(71) Applicant: Bayerische Motoren Werke Aktiengesellschaft, Munich (DE)

(72) Inventors: Patrick Dumm, Offenstetten (DE); Joachim Froeschl, Herrsching (DE); Marcus Raepple, Walpertskirchen (DE); Rudolf Schilling, Ergolding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 176 days.

(21) Appl. No.: 17/792,800

(22) PCT Filed: Dec. 7, 2020

(86) PCT No.: PCT/EP2020/084899
§ 371 (c)(1),
(2) Date: Jul. 14, 2022

(87) PCT Pub. No.: WO2021/144069
PCT Pub. Date: Jul. 22, 2021

(65) Prior Publication Data
US 2023/0041318 A1    Feb. 9, 2023

(30) Foreign Application Priority Data

Jan. 15, 2020 (DE) ...................... 10 2020 100 800.7

(51) Int. Cl.
B60R 16/02    (2006.01)
B62D 27/06    (2006.01)

(52) U.S. Cl.
CPC .......... B60R 16/0215 (2013.01); B62D 27/06 (2013.01)

(58) Field of Classification Search
CPC .......... B60R 6/0215; H01B 7/40; H02G 3/04; H02G 3/30; H02G 3/0418; H02G 3/0431; H02G 3/0437
See application file for complete search history.

(56) References Cited

U.S. PATENT DOCUMENTS

| | | | |
|---|---|---|---|
| 11,715,944 B1 * | 8/2023 | Baldwin | H02G 9/04 174/207 |
| 2008/0173397 A1 | 7/2008 | Hengel et al. | |
| 2021/0032872 A1 * | 2/2021 | Clarke, Jr. | H02G 3/0418 |

FOREIGN PATENT DOCUMENTS

| | | | |
|---|---|---|---|
| DE | 1 801 569 A1 | 4/1970 | |
| DE | 36 23 073 A1 | 1/1988 | |

(Continued)

OTHER PUBLICATIONS

International Search Report (PCT/ISA/210) issued in PCT Application No. PCT/EP2020/084899 dated Mar. 15, 2021 with English translation (five (5) pages).

(Continued)

*Primary Examiner* — Paresh Paghadal
(74) *Attorney, Agent, or Firm* — Crowell & Moring LLP

(57) ABSTRACT

A fastening arrangement of a supply rail in a connection region in which two bodywork components are connected to one another is provided, in which arrangement the supply rail rests on a first bodywork component and is held on the first bodywork component via a holding element. By way of the holding element, the first bodywork component is held on the second bodywork component.

10 Claims, 2 Drawing Sheets

(56) References Cited

FOREIGN PATENT DOCUMENTS

| | | |
|---|---|---|
| DE | 44 10 172 A1 | 9/1995 |
| DE | 693 00 652 T2 | 7/1996 |
| DE | 101 61 643 A1 | 7/2003 |
| DE | 10 2011 106 912 A1 | 1/2013 |
| DE | 20 2012 104 988 U1 | 5/2014 |
| DE | 10 2014 011 990 A1 | 3/2015 |
| DE | 10 2017 203 862 B3 | 1/2018 |
| EP | 1 044 849 A1 | 10/2000 |

OTHER PUBLICATIONS

German-language Written Opinion (PCT/ISA/237) issued in PCT Application No. PCT/EP2020/084899 dated Mar. 15, 2021 (three (3) pages).
German-language Office Action issued in German Application No. 10 2020 100 800.7 dated Oct. 6, 2020 (six (6) pages).

\* cited by examiner

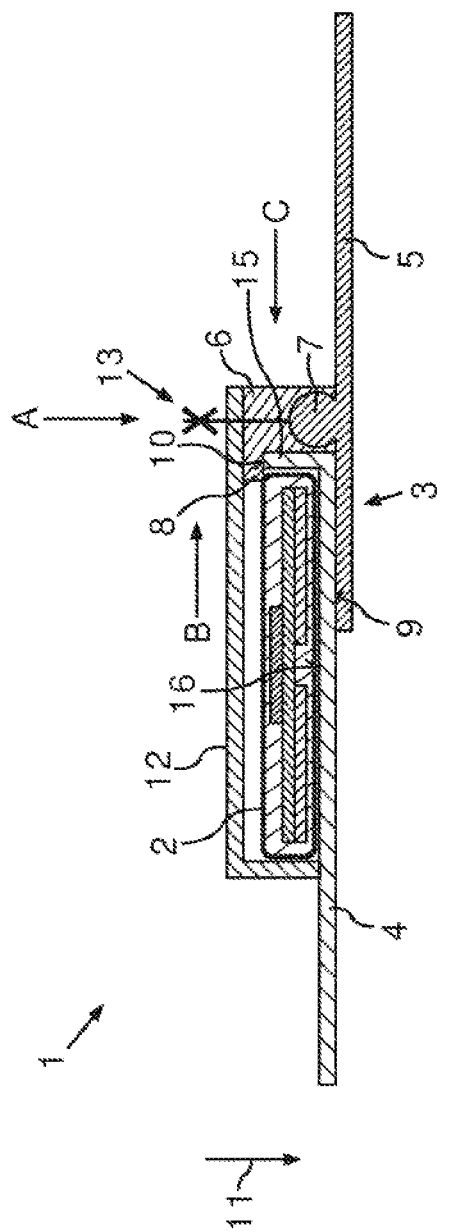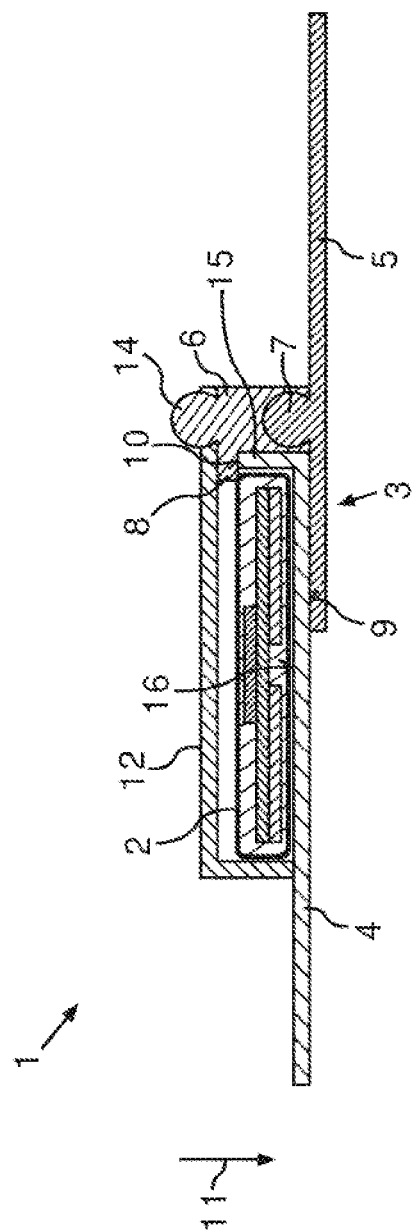

A:

B:

C:

C:

FASTENING ARRANGEMENT AND METHOD FOR PRODUCING A FASTENING ARRANGEMENT

BACKGROUND AND SUMMARY

The invention relates to a fastening arrangement of a supply rail on a motor vehicle body and to a method for producing a fastening arrangement of a motor vehicle body.

DE 10 2017 203 862 B3 discloses a heat source which can be an electric or electronic device, an electric motor, or power electronics of an electric or hybrid vehicle. The heat source has a heat-dispensing body which, in turn, has a recess in the shape of a spherical cap and in which a ball is entirely or at least partially arranged. The recess in the shape of a spherical cap lies tightly against the ball, as a result of which good heat transfer between the heat-dispensing body and the ball is ensured. The ball is thermally conductively connected to a heat-removing component which may be a sheet metal part of a vehicle body.

It is the object of the present invention to provide a fastening arrangement and a method for producing a fastening arrangement which permit a supply rail to be held particularly securely on a motor vehicle body.

This object is achieved according to the invention by a fastening arrangement of a supply rail in a connecting region and by a method for producing a fastening arrangement of a supply rail in a connecting region. Advantageous embodiments of the invention are the subject matter of the dependent patent claims and of the description.

A first aspect relates to a fastening arrangement of a supply rail in a connecting region in which two body components of a motor vehicle are connected to each other. The connecting region therefore comprises a connecting point at which the motor vehicle components are in contact with each other. Provision is made, in the case of the fastening arrangement, for the supply rail to rest on a first body component and to be held on the first body component via a holding element. In particular, the supply rail, the first body component and the second body component are arranged overlapping one another in a fastening direction in the connecting region. Furthermore, the first body component is held on the second body component by means of the holding element. This means that the holding element is used both to fasten the supply rail to the first body component and to connect the first body component to the second body component. It is therefore possible, in one working step, by fastening the holding element to the second body component, both to connect the body components to each other and to fix the supply rail to the first body component. By this means, the supply rail is fastenable particularly rapidly to the first body component, and the body components are connectable to each other particularly rapidly.

In a development of the invention, it has been shown to be advantageous if a cover element is held on the holding element, the cover element being used to circumferentially surround the supply rail together with the first body component. This means that the cover element is fastened to the holding element, the cover element overlapping the supply rail outward at least in regions. In particular, the cover element overlaps the supply rail on the sides of the supply rail that face away from the first body component. The cover element and the first body component are therefore used to at least substantially completely surround the supply rail circumferentially, as a result of which the cover element together with the first body component provides a housing for the supply rail. The cover element and the first body component can be used to surround the supply rail so as to be, for example, watertight with respect to a surroundings. Furthermore, slipping or detaching of the supply rail from the first body component can be prevented by means of the cover element. The supply rail can thereby be held particularly securely on the first body component. Furthermore, the supply rail can be protected by the cover element and the first body component against soiling and damage, as a result of which a particularly long service life of the supply rail can be achieved.

In a further refinement of the invention, it has been shown to be advantageous if the holding element is held on the second body component and/or the cover element is held on the holding element via at least one screw connection or via at least one spherical fastening element. This means that the holding element can be screwed to the second body component and/or the cover element can be screwed to the holding element, for a particularly secure connection. Alternatively or additionally, the holding element can be clipped to the second body component and/or the cover element to the holding element via the at least one spherical fastening element. In particular, the connection via the spherical fastening element can be produced by an undercut by engagement taking place behind the spherical fastening element. For example, the second body component can have the at least one spherical fastening element, and the holding element can have at least one receptacle which is assigned to the respective spherical fastening element and in which the spherical fastening element can be accommodated by being clipped in, as a result of which the holding element engages behind the spherical fastening element fastened to the second body part. Alternatively or additionally, the holding element can have at least one spherical fastening element which can be clipped into a respective receptacle of the cover element or of the second body component, the receptacle being assigned to the spherical fastening element. A particularly secure connection between the holding element and the cover element and/or the second body component can be produced particularly rapidly by means of the at least one spherical fastening element. In particular, a plurality of spherical fastening elements can be provided via which the respective connection is produced.

In a further refinement of the invention, it is provided that the holding element is fastened to the second body component and is formed separately from the first body component. Furthermore, it is provided that the holding element grips the first body component in regions, as a result of which the first body component is held on the second body component. This means that the holding element is formed separately both from the first body component and from the second body component. In order to connect the first body component to the second body component, the holding element is fastened to the second body component. Furthermore, it is provided that the holding element grips the first body component, for example by the holding element lying at least in regions on a side of the first body component that faces away from the second body component. This means that the first body component lies with a first side on the second body component and lies with a second side opposite the first side on the holding element. The gripping of the first body component by means of the holding element enables the first body component to be held particularly securely on the second body component. Furthermore, the first body component can be arranged particularly simply on the second body component via the holding element, as a result of which the connection between the first body component and the second body component can be produced particularly simply.

In a development of the invention, it is provided that the side of the first body component facing away from the second body component has a notch in which the holding element engages. The holding element can be fixed relative to the first body component via the notch, and therefore the first body component is held on the second body component particularly securely and in a fixed position by means of the holding element. Slipping of the first body component relative to the second body component can therefore be advantageously prevented. A relative position between the holding element and the first body component can be predetermined via the notch, as a result of which particularly secure positioning of the body components relative to each other can be achieved. When the first body component is gripped by the holding element, the holding element engages in the notch, and therefore the holding element is aligned relative to the first body component. The notch therefore permits particularly simple centering of the first body component relative to the holding element and therefore to the second body component on which the holding element is held.

In a further refinement of the invention, it is provided that the first body component has at least one guide element by means of which the holding element can be guided relative to the first body component. In particular, the first body component has a plurality of guide elements by means of which the holding element can be guided for centering the first body component relative to the holding element and therefore relative to the second body component, which holds the holding element, in order to center the first body component with respect to the second body component. It can be ensured by means of the at least one guide element, when the fastening arrangement is produced, that the first body component is connected to the second body component in a predetermined fastening position relative to the second body component. The at least one guide element runs, for example, parallel to a fastening direction which extends from the first side of the first body component to the second side of the body component. The fastening direction corresponds to a direction of an action of force of the holding element on the second side of the first body component, with which force by means of the holding element the first body component is pressed onto the second body component.

In a further refinement of the invention, it has been shown to be advantageous if the first body component has a protruding collar which laterally covers the supply rail resting on the first body component and via which the first body component is held on the second body component by means of the holding element. This protruding collar has the second side of the first body component, on which side the holding element lies on the first body component. The cover element can be fastened to, and/or the notch arranged on, the second side and therefore the collar. Alternatively or additionally, the collar can have the at least one guide element. In the fastening arrangement, the collar can be oriented in particular perpendicularly to a plane of extent of the second body component, the latter having the plane of extent in the connecting region, and therefore the collar encloses an angle of approx. 90° with the plane of extent of the second body component. The holding element engages over a free edge of the collar in order to hold the supply rail on the first body component. The collar which laterally overlaps the supply rail and which is gripped by the holding element in the fastening arrangement can be used firstly to protect the supply rail laterally from damage or soiling and secondly to laterally position the supply rail.

In a further refinement of the invention, it has been shown to be advantageous if the holding element is adhesively bonded to the first body component. This means that the holding element is held on the second body component via the screw connection and/or the at least one spherical fastening element, grips the first body component, and is adhesively bonded to the first body component. The first holding element is therefore connected to the first body component via an adhesive, as a result of which a particularly secure connection of the holding element to the first body component can be achieved.

In an alternative refinement of the invention, the holding element is formed integrally with the first body component. This means that the holding element is integrally formed on the first body component. Via at least one screw connection or at least one spherical fastening element, the holding element, and therefore the first body component via the holding element, can be fastened to the second body component. The holding element is configured to hold the supply rail on the first body component, for example by the holding element gripping the supply rail at least in regions. The integral formation of the holding element with the first body component enables the fastening arrangement to be produced from particularly few components, and therefore the fastening arrangement can be provided particularly rapidly.

The invention furthermore relates to a method for producing a fastening arrangement of a supply rail in a connecting region in which two body components are connected to each other. It is provided, in the method, that the supply rail is arranged on a first body component. Furthermore, it is provided that the first body component is arranged on a second body component. Moreover, in the method, a holding element is fastened to the second body component, by means of which holding element the supply rail is held on the first body component and the first body component is held on the second body component. Using the holding element, simultaneously in one step the supply rail can be fastened to the first body component and the first body component can be fastened to a second body component, as a result of which the fastening arrangement can be provided particularly rapidly and therefore with a particularly short cycle time.

Advantages and advantageous developments of the fastening arrangement according to the invention should be regarded as advantages and advantageous developments of the method according to the invention, and vice versa. For this reason, the further advantages and advantageous developments of the method according to the invention are not described specifically here.

Further features of the invention emerge from the claims, the figures and the description of the figures. The features and combinations of features mentioned above in the description and the features and combinations of features mentioned below in the description of the figures and/or in the figures alone can be used not only in the respectively stated combination, but also in different combinations or by themselves.

The invention will now be explained in more detail using a preferred exemplary embodiment and with reference to the drawings.

BRIEF DESCRIPTION OF THE DRAWINGS

FIG. 1 is a schematic sectional view of a fastening arrangement of a supply rail to a first body component which is held on a second body component via a holding element, wherein the supply rail is held on the first body component by means of the holding element, the holding element is held on the second body component via at least one spherical fastening element, and a cover element is held on the holding element via a screw connection, by which cover element the supply rail is outwardly covered on its sides which are not covered with respect to the first body component.

FIG. 2 is a schematic sectional view of the fastening arrangement in an alternative refinement, in which the cover element is held on the holding element via a second spherical fastening element, as a result of which a clip connection of the cover element to the holding element is provided.

Functionally identical elements are provided with the same reference signs in the figures.

DETAILED DESCRIPTION OF THE DRAWINGS

Figure 3:
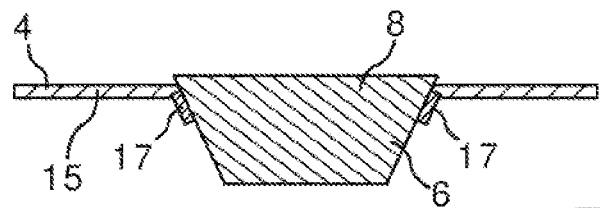
FIG. 3 is a top view of the holding element in the direction of the arrow A shown in FIG. 1, wherein the first body component has two guide elements by means of which the holding element can be centered relative to the first body component.

FIGS. 1 and 2 illustrate respective fastening arrangements 1 of a supply rail 2 on a body of a motor vehicle, in particular an automobile, in sectioned form in different embodiments. Electrical energy and/or data, for example for a component of the motor vehicle, can be transmitted by means of the supply rail 2. In particular, the supply rail 2 serves for transmitting electrical energy and/or data between two motor vehicle components. In order to permit a particularly secure fastening of the supply rail in the motor vehicle, it is provided, in the case of the fastening arrangement 1, that the supply rail 2 is held in a connecting region 3 on a first body component 4. The connecting region 3 comprises a contact point between the first body component 4 and a second body component 5. In the connecting region 3, the first body component 4 and the second body component 5 are therefore in contact with each other or are connected to each other. The first body component 4 and the second body component 5 are both components of a body of the motor vehicle.

In order to connect the body components 4, 5 to each other and, furthermore, to hold the supply rail 2 on the first body component 4, a holding element 6 is provided. In the present case, the holding element 6 is clipped onto a plurality of first fastening elements 7 which are integrally formed on the second body component 5 and which are at least substantially spherical. The holding element 6 has an arm 8 which can be used to grip the first body component 4. The first body component 4 is fastenable to the second body component 5 by means of the arm 8. For fastening the first body component 4 to the second body component 5, the first body component 4 is placed in regions with a first side 9 onto the second body component 5. Subsequently, the arm 8 of the holding element 7 is placed onto a second side 10 of the first body component 4 opposite the first side 9. By means of the arm 8, a pressure can therefore be exerted on the second side 10 of the first body component 4 in order to press the first body component 4 with its second side 9 onto the second body component 5. By this means, the first body component 4 is acted upon with a force along a fastening direction 11 running from the second side toward the first side 9. In order to hold the supply rail 2 in the connecting region 3 on the first body component 4, it is provided that the supply rail 2 is placed onto the first body component 4 and is acted upon with a force by means of the arm 8 of the holding element 6 in order to press the supply rail 2 along the fastening direction 11 onto the first body component 4 and thereby to fasten it.

A cover element 12 is arranged on and fastened to the holding element 6 here. The supply rail 2 is covered by means of the cover element 12 toward its sides arranged without covering the first body component 4. This means that the cover element 12 together with the first body component 4 at least circumferentially surrounds the supply rail 2. The supply rail 2 can be surrounded so as to be watertight with respect to the surroundings of the fastening arrangement 1 via the cover element 12 and the first body component 4. As shown in FIG. 1, the cover element is connected via a screw connection 13, or as shown in FIG. 2, via at least one second spherical fastening element 14, to the holding element 6 or can be clipped onto the holding element 6. It can be provided here that either the holding element 6 has the at least one second spherical fastening element 14, which can engage in a receptacle of the cover element 12, or that the cover element 12 has the at least one second spherical fastening element 14 which can latch into a corresponding receptacle of the holding element 6 in order to produce the connection between the cover element 12 and the holding element 6. Alternatively, the cover element 12 and the holding element 6 can be formed integrally.

Figure 4:
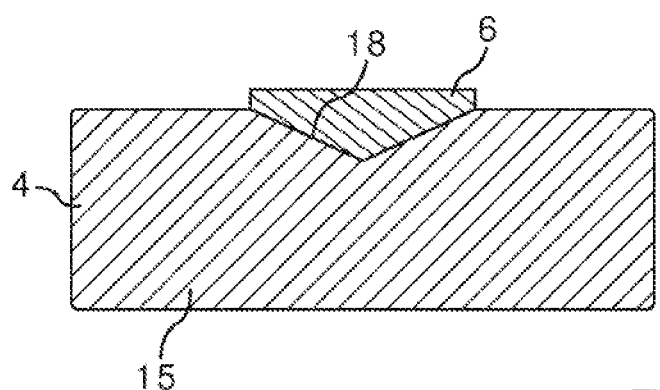
FIG. 4 is a schematic side view of the holding element, which grips the first body component, in the direction of the arrow B shown in FIG. 1, the holding element engaging in a notch of the first body component.
Figure 5:
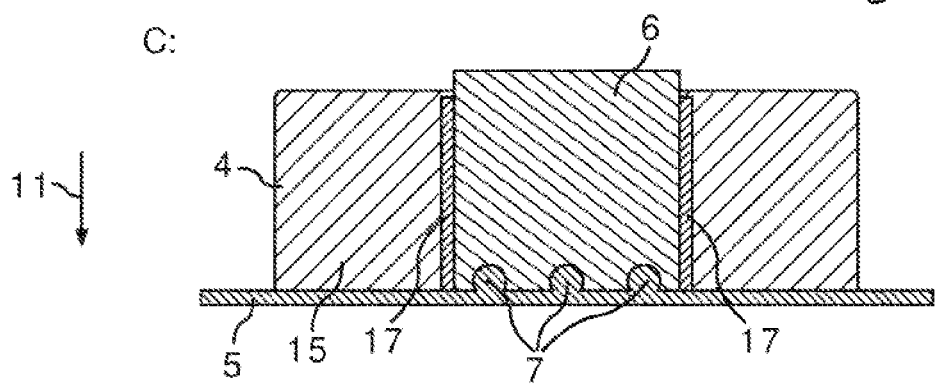
FIG. 5 is a further schematic side view of the holding element in the direction of the arrow indicated by C in FIG. 1, the holding element being clipped onto three first spherical fastening elements of the second body component and being guided relative to the first body component by means of the two guide elements.

The holding element 6 is illustrated in different views in FIGS. 3, 4 and 5, with the cover element 12 or a connecting option for connecting the holding element 6 to the cover element 12 not being illustrated in any of the illustrations. The holding element 6 shown in FIGS. 3 to 5 can be free from a connecting device via which the holding element 6 is connectable to the cover element 12, or it can have a connecting device, not illustrated in FIGS. 3 to 5, by means of which the holding element 6 is connectable to the cover element 12 via at least one screw connection 13 and/or at least one second spherical fastening element 14.

FIGS. 3 to 6 each illustrate a collar 15 of the first body component 4, which collar can be gripped at least in regions by the arm 8 of the holding element 6. In the case of the fastener arrangement 1, the collar 15 protrudes at least substantially in the fastening direction 11 from the second body component 5. The collar 15 can protrude here in the movement direction 11 beyond a supporting surface 16 on which the supply rail 2 rests on the first body component 4. FIG. 3 illustrates the holding element 6 in a top view in which it can be seen that the arm 8 of the holding element 6 engages over the collar 15. Furthermore, it can be seen that the arm 8 has a trapezoidal outline which widens toward one side of the collar 15 on which the supply rail 2 is located. Furthermore, it can be seen from FIG. 3 that two guide elements 17 which extend with their longitudinal direction of extent parallel to the fastening direction 11 are arranged here on the collar 15. The first body component 4 can be centered relative to the holding element 6 by means of the guide elements 17 in order to permit a particularly precise positioning of the first body component 4 with respect to the holding element 6. The guide elements 17 protrude here obliquely from the collar 15 of the first body component 4 and are adapted in their oblique orientation to the slope of side edges of the trapezoidal basic form of the arm 8.

FIG. 4 shows the collar 15 on its side facing the supply rail 2. It can be seen here that the collar 15 has a notch 18 in which the arm 8 engages when placed onto the collar 15. The notch 18 runs with its direction of longitudinal extent from the side of the collar 15 facing the supply rail 2 to an opposite side of the collar 15 facing away from the supply rail 2. The first body component 4 and the holding element 6 are positionable relative to each other by means of the notch 18 which tapers in the fastening direction 11.

FIG. 5 shows the collar 15 on the side of the collar 15 which faces away from the supply rail 2. The holding element 6 is illustrated in sectioned form here. In the sectional illustration of the holding element 6, the first spherical fastening element 7 via which the holding element 6 is connected to the second body component 5 can be seen. For the connection of the holding element 6 to the second body component 5, the holding element 6 is clipped onto the first spherical fastening element 7. For this purpose, the holding element 6 has respective receptacles which are assigned to the first spherical fastening element 7 and correspond to an outer contour of the fastening elements 7 and in which the first spherical fastening elements 7 can be accommodated during the production of the connection between the holding element 6 and the second body component 5. It can furthermore be seen in FIG. 5 how the guide elements 17 can be used to guide the holding element 6 in order to position the first body component 4 relative to the second body component 5. For a particularly firm connection between the first body component 4 and the holding element 6, the first body component 4 can be adhesively bonded to the holding element 6.

Figure 6:
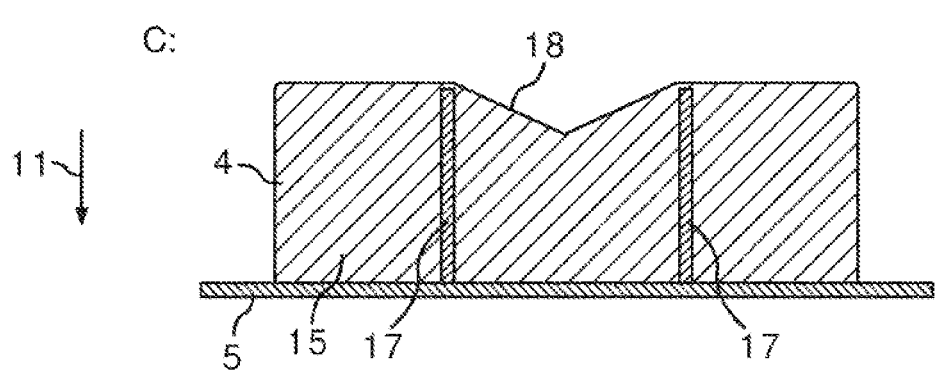
FIG. 6 is a schematic side view of the first body component in the direction of the arrow shown by C in FIG. 1, wherein a protruding collar of the first body component is illustrated in a front view, the collar having the two guide elements and the notch and being able to be gripped by the holding element.

FIG. 6 illustrates the collar 15 on its side facing away from the supply rail 2. The notch 18 and the guide elements 17 can be seen in combination here. Centering both via the notch 18 and via the guide elements 17 makes it possible to particularly precisely predetermine a relative position to be set between the first body component 4 and the holding element 6 which is fastened to the second body component 5.

In order to produce the fastening arrangement 1, the first body component 4 and the second body component 5 are therefore placed on each other in the connecting region 3. Subsequently, the supply rail 2 is placed onto the supporting region 16 of the first body component. The holding element 6 is then fastened to the second body component 5, with the arm 8 of the holding element 6 engaging over the collar 15 of the first body component 4 and pressing the supply rail 2 onto the supporting region 16 in order to hold the supply rail 2 on the first body component 4.

In an embodiment which is not illustrated in the figures, the holding element 6 can be formed integrally with the first body component 4. In order to produce the fastening arrangement 1, the supply rail 2 is therefore placed onto the contact region 16 of the first body component 4, with the arm 8 of the holding element 6 pressing the supply rail 2 onto the contact region 16 of the first body component 4. Furthermore, the holding element 6 is connected to the second body component 5 in order to fasten the second body component 5 to the first body component 4 and to thereby provide the fastening arrangement 1. The second body component 5 can be screwed here to the holding element 6 and/or can be clipped to the holding element 6 via at least one spherical first fastening element 7. The supply rail 2 which can serve for supplying energy and data in the vehicle can be integrated in the connecting region 3 of the body components 4, 5 by means of the holding element 6.

The fastening arrangement 1 permits cost-effective machine and/or robot premanufacturing of the supply rail 2 being integrated at a transition between the two body components 4, 5. Overall, the invention shows how the supply rail 2 can be provided on a body structure.

LIST OF REFERENCE SIGNS

1 Fastening arrangement
2 Supply rail
3 Connecting region
4 First body component
5 Second body component
6 Holding element
7 First spherical fastening element
8 Arm
9 First side
10 Second side
11 Fastening device
12 Cover element
13 Screw connection
14 Second spherical fastening element
15 Collar
16 Supporting side
17 Guide element
18 Notch

What is claimed is:

1. A fastening arrangement, comprising:
   a supply rail;
   first and second body components that overlap and are connected to each other in a connecting region, wherein the supply rail rests on the first body component in the connecting region; and
   a holding element operatively connected to the second body component, the holding element having a protrusion by which the first body component is held on the second body component and the supply rail is held on the first body component.

2. The fastening arrangement according to claim 1, further comprising:
   a cover held on the holding element, the cover circumferentially surrounding the supply rail together with the first body component.

3. The fastening arrangement according to claim 2, wherein
   the holding element is held on the second body component and/or the cover is held on the holding element via at least one screw connection or via at least one spherical fastening element received in a corresponding receptacle shaped to accommodate the spherical fastening element.

4. The fastening arrangement according to claim 1, wherein
   the holding element is fastened to the second body component and is formed separately from the first body component and grips the first body component in regions, as a result of which the first body component is held on the second body component.

5. The fastening arrangement according to claim 1, wherein a side of the first body component facing away from the second body component has a notch in which the holding element engages.

6. The fastening arrangement according to claim 1, wherein
the first body component has at least one guide element by which the holding element is guidable relative to the first body component.

7. The fastening arrangement according to claim 1, wherein
the first body component has a protruding collar which laterally covers the supply rail resting on the first body component and via which the first body component is held on the second body component via the holding element.

8. The fastening arrangement according to claim 1, wherein
the holding element is adhesively bonded to the first body component.

9. The fastening arrangement according to claim 1, wherein
the holding element is formed integrally with the first body component.

10. A fastening method, comprising:
arranging a supply rail in a connecting region on a first body component, the first body component overlapping with and being arranged on and connected to a second body component in the connecting region;
fastening a holding element to the second body component, the holding element having a protrusion by which the supply rail is held on the first body component and the first body component is held on the second body component.

* * * * *